March 30, 1954 W. B. LYON 2,673,780
SELECTIVE DISPLAY CABINET
Filed Feb. 24, 1951 9 Sheets-Sheet 1

INVENTOR.
William Bronson Lyon
BY
Attorney

March 30, 1954

W. B. LYON 2,673,780

SELECTIVE DISPLAY CABINET

Filed Feb. 24, 1951

INVENTOR.
William Bronson Lyon
BY

Attorney

INVENTOR.
William Bronson Lyon
Attorney

March 30, 1954     W. B. LYON     2,673,780
SELECTIVE DISPLAY CABINET

Filed Feb. 24, 1951     9 Sheets-Sheet 5

INVENTOR,
William Bronson Lyon
Attorney

INVENTOR.
William Bronson Lyon
BY
Attorney

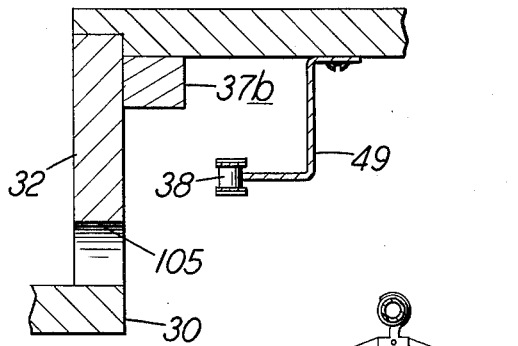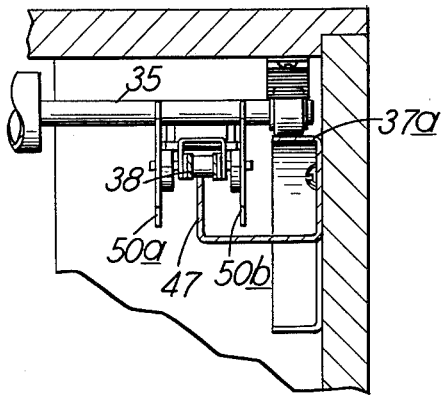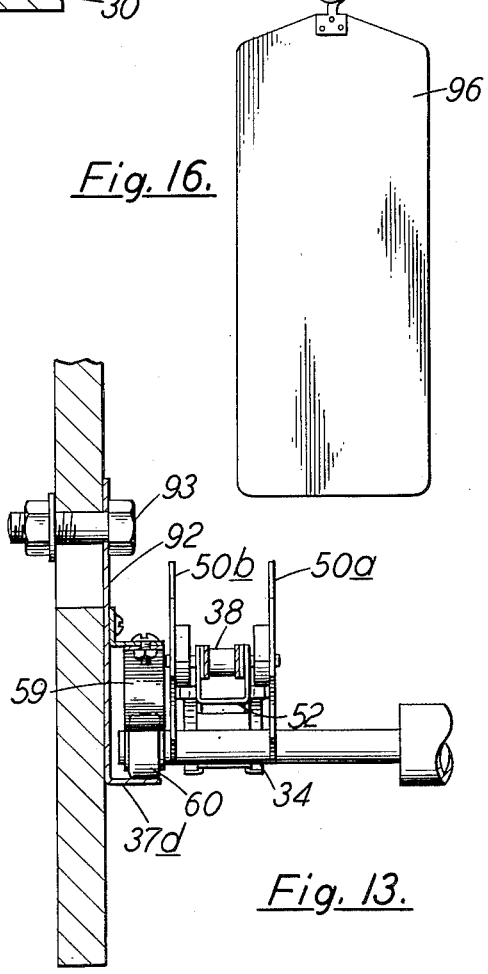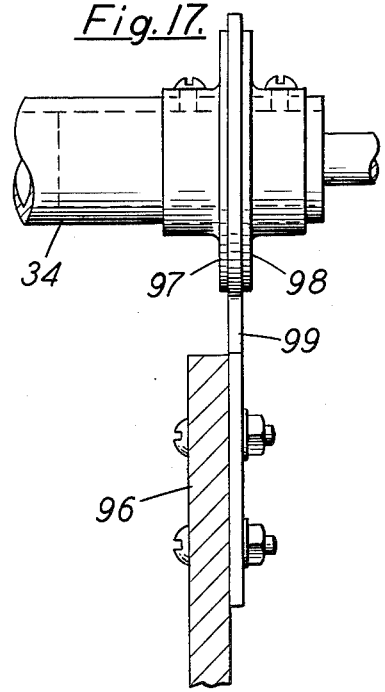

March 30, 1954  W. B. LYON  2,673,780
SELECTIVE DISPLAY CABINET
Filed Feb. 24, 1951  9 Sheets-Sheet 8

INVENTOR.
William Bronson Lyon
BY
Attorney

March 30, 1954  W. B. LYON  2,673,780
SELECTIVE DISPLAY CABINET
Filed Feb. 24, 1951  9 Sheets-Sheet 9

INVENTOR.
William Bronson Lyon
-BY-
Attorney

Patented Mar. 30, 1954

2,673,780

UNITED STATES PATENT OFFICE 2,673,780

SELECTIVE DISPLAY CABINET

William Bronson Lyon, Grand Rapids, Mich.

Application February 24, 1951, Serial No. 212,534

2 Claims. (Cl. 312—234)

The present invention provides facilities for the storage and display of various articles. Minor changes in design will suffice to adapt it to handling almost any type of merchandise or other item. In the preferred form, mechanism is built into a cabinet structure so that the contents of the cabinet may be selectively brought to and from an opening appropriately placed for access, examination, removal, and insertion of whatever articles the device is adapted to accommodate. This development has been primarily intended for use in retail stores where floor space is at a premium. Conventional fixed storage and display cabinets utilize only the space above the occupied floor area up to a height approximating the average height of an individual. The space above this height up to the ceiling remains unutilized; and the presence of this available space has been recognized by several inventors who have produced mechanisms adapted to store and move merchandise within this area, and to bring it to a position where customers and store attendants may examine it and remove it from the carrying mechanism.

Other attempts have been made to more effectively utilize a given amount of floor space for the storage of merchandise by arranging the merchandise in several rows in depth, with provision being made for rotating these rows in a horizontal plane so as to make them selectively accessible from the aisle-way of the store. A primary objection to this type of equipment is the obstruction created in the aisle-way whenever the device is operated. The requirement of a considerable amount of clearance in the aisle-way makes unusually large aisle-ways necessary, with consequent loss of storage area.

A primary purpose of the present invention is to utilize the space above that which is normally occupied by the conventional fixed storage cabinet. Mechanism is provided by the present invention to shift the contents of a storage cabinet to and from a viewing station on the floor level where a portion of the contents of the cabinet are presented at any given time. The operation of the mechanism is confined to the space which may be defined as the upwardly-projected floor area of the cabinet, and thus the present invention does not require clearance space in the aisle-way during its operation. The result of these features gives a much more economical use of a given floor area, since (a) a greater volume of space is made available for storage directly above that floor area, and (b) a floor layout may be based upon a much narrower aisle-way due to the absence of clearance requirements for the moving display equipment. In an average case, it may be conservatively estimated that a thirty per cent saving in floor space is effected by the present invention to display a given quantity of merchandise over that which would be required by conventional methods in general use. Other types of devices directed toward the utilization of the space under the ceiling have not come into general use due to their complexity and general difficulty of maintenance. The present invention has accordingly been conceived primarily to provide these performance features while preserving a degree of mechanical simplicity that will make the units trouble-free in operation and of a sufficiently low initial cost to render them usable in an ordinary store.

During the period of development of the mechanism generally outlined above, several other possible fields of utility have appeared in which this invention may be utilized with but minor alterations. The storage of many commodities in warehouses necessitates the use of a maximum quantity of space underneath the ceiling, and devices embodying the present invention will make use of this space without the necessity of providing ladders or other elevating equipment otherwise necessary for personnel. While the simplest form of the present invention provides merely a set of hang rods on which clothing can be suspended, a very minor adaption is sufficient to provide a series of suspended containers adapted to hook over these hang rods and which will prove satisfactory for carrying bulk items or smaller articles of almost any description. It is also contemplated that this invention may be utilized in instances where the primary purpose is exhibition rather than storage. Thus, a show window display may be built around a device in which articles are successively exhibited to passers-by. Since window space is a rather costly item, the present invention will make possible the display of a much greater quantity of merchandise within a given show window area, and will thus create a substantial saving. The shifting of position of the merchandise will in itself tend to attract attention of passers-by, and this will add to the value of the arrangement. This invention is an improvement on that shown in my United States Patent 2,513,502, issued July 4, 1950.

The several features of the present invention will be discussed in detail by an analysis of the particular embodiments illustrated in the accompanying drawings.

Figure 3:
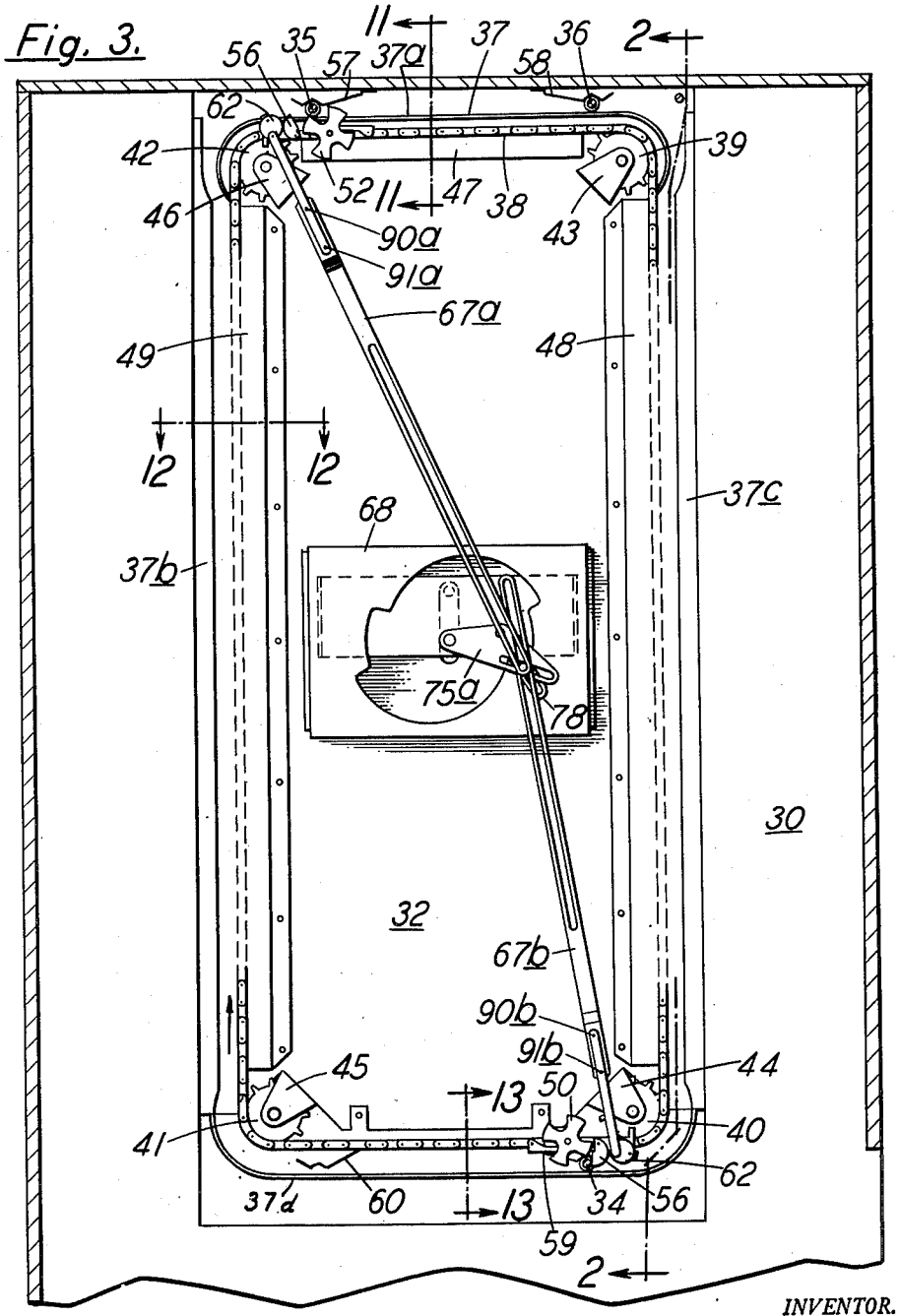
Figure 3 (see Sheet 3) is a view in elevation taken from the inside of the device and taken on the plane 3—3 of Figure 2. This view presents the moving mechanism of the cabinet.
Figure 4:
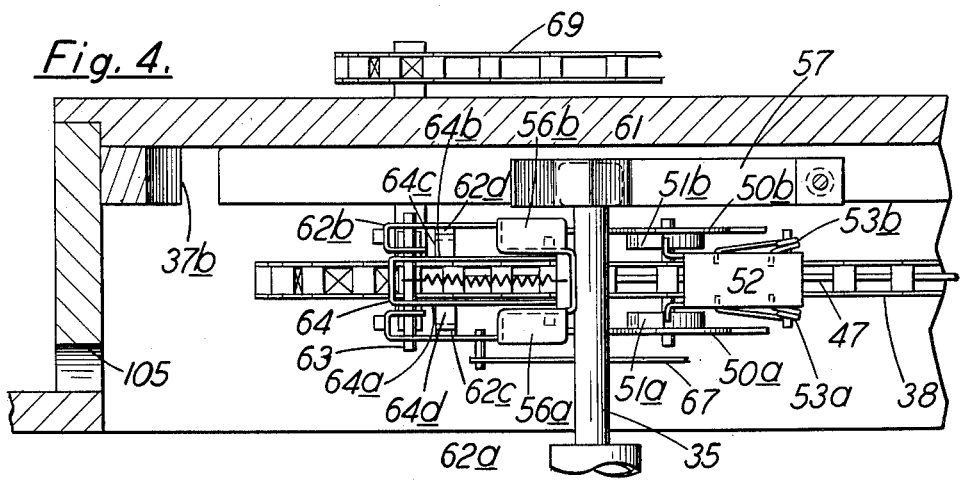

Figure 4 (see Sheet 4) presents a top view on an enlarged scale of the upper left corner of the mechanism shown in Figure 3.

Figure 5:
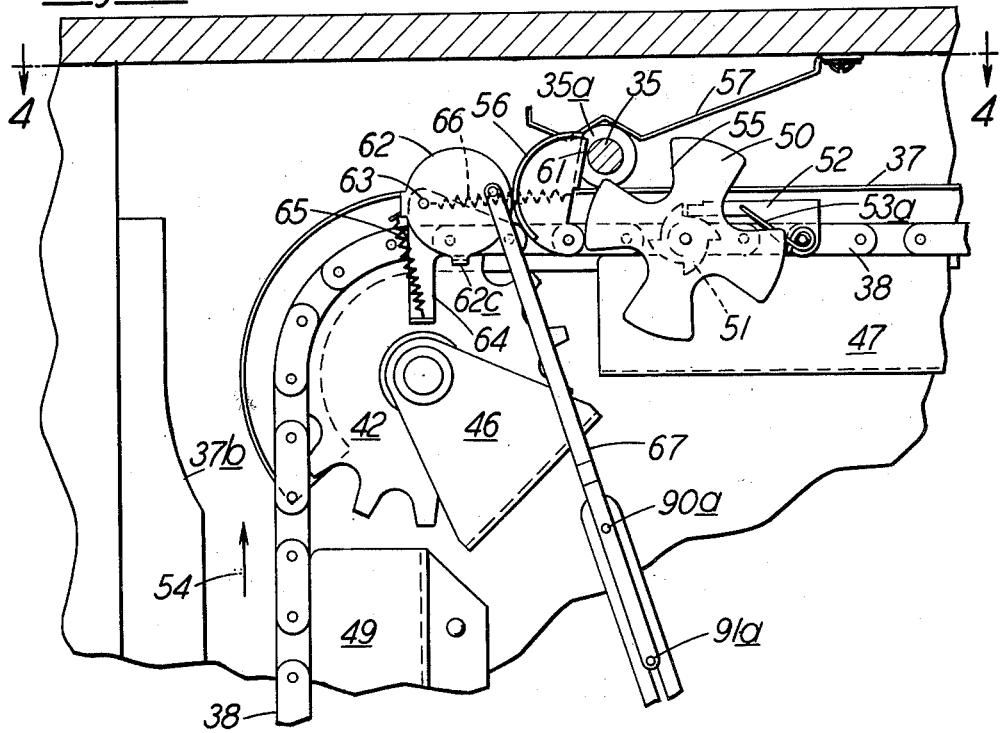

Figure 5 (see Sheet 4) presents an enlarged view in elevation of the upper left corner of the mechanism shown in Figure 3. This view and Figure 4 are in projection.

Figure 6:
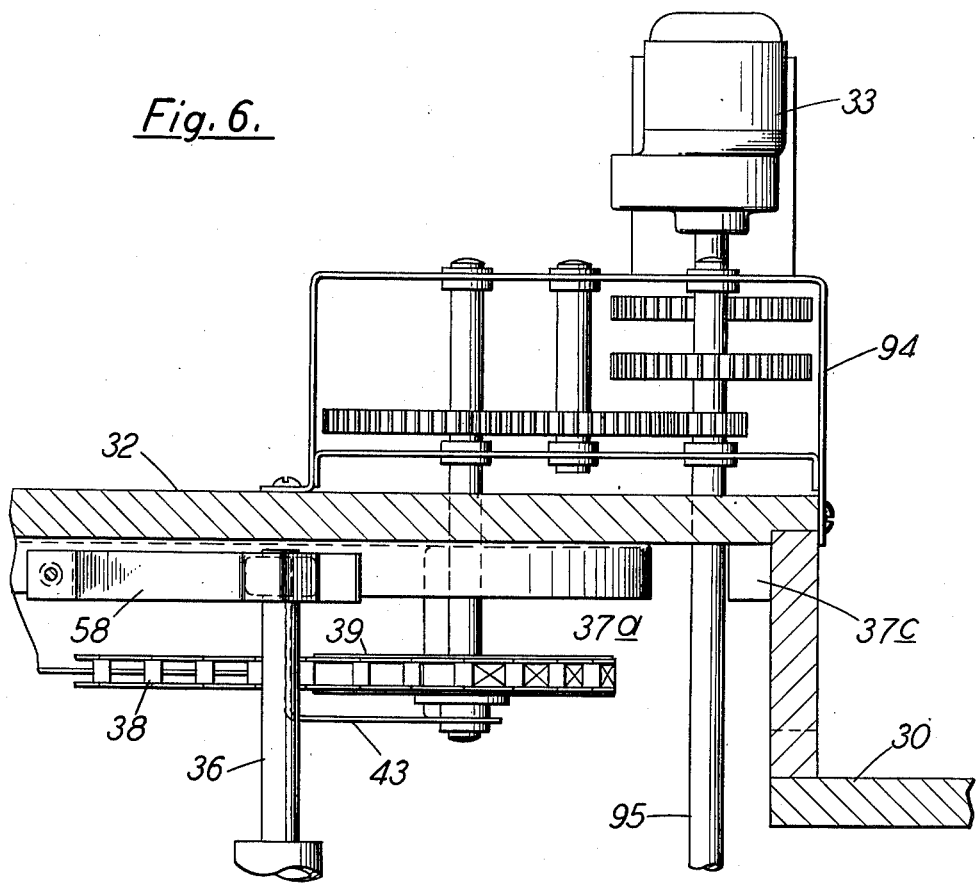

Figure 6 (see Sheet 5) is a top view on an enlarged scale of the upper right corner of the mechanism shown in Figure 3, and presents the driving equipment.

Figure 7:
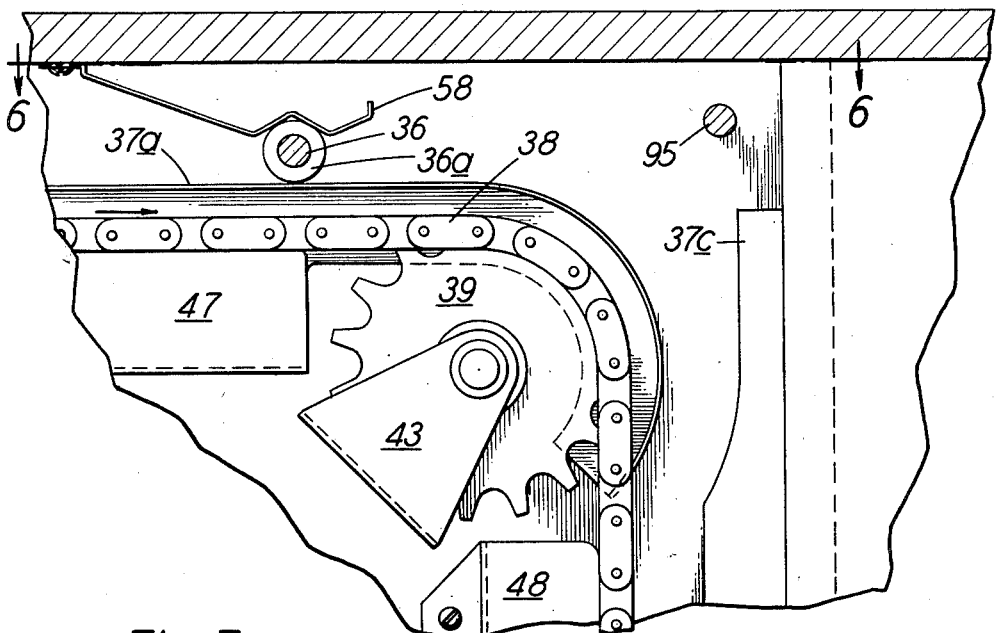

Figure 7 (see Sheet 1) shows a view in elevation of the upper right corner of the mechanism shown in Figure 3 on an enlarged scale.

Figure 8:
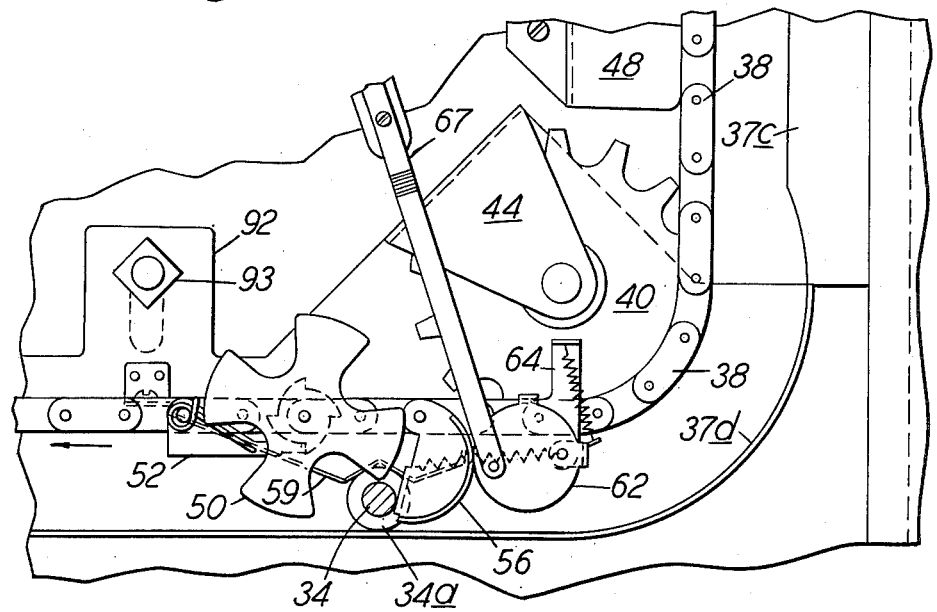

Figure 8 (see Sheet 6) is an enlarged view of the lower right corner of the mechanism shown in Figure 3.

Figure 9:
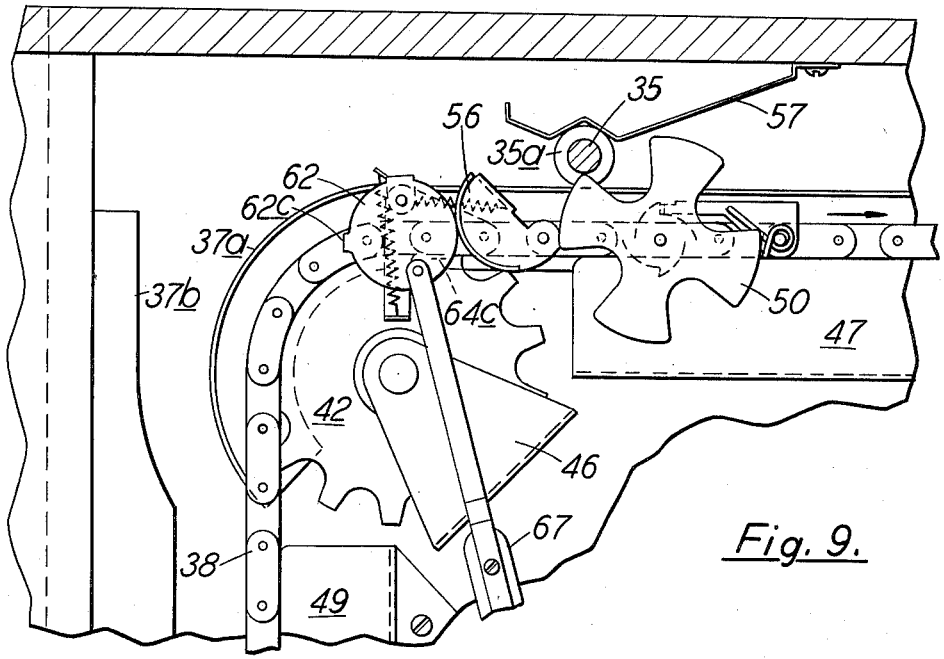

Figure 9 (see Sheet 6) presents an enlarged view of the upper left corner of the mechanism shown in Figure 3 with the chain attachments in the disengaged position.

Figure 10:
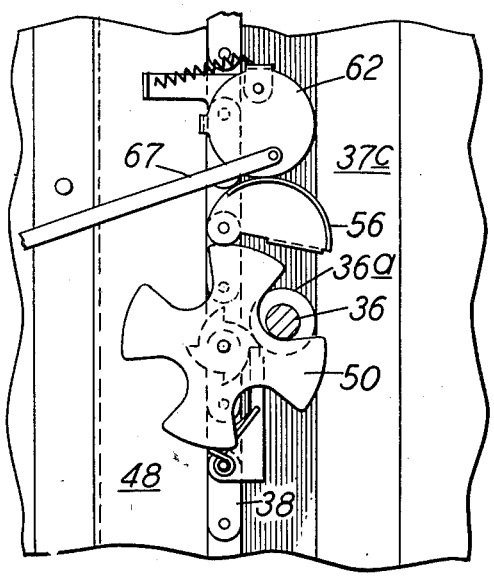

Figure 10 (see Sheet 5) illustrates the relationship of the chain attachments and the hang rod as the rod is moving downwardly and is supported by the star-wheel.

Figure 11 (see Sheet 7) presents an enlarged section on the plane 11—11 of Figure 3.

Figure 12 (see Sheet 7) presents an enlarged section taken on the plane 12—12 of Figure 3.

Figure 13 (see Sheet 7) presents an enlarged section taken on the plane 13—13 of Figure 3.

Figure 14:
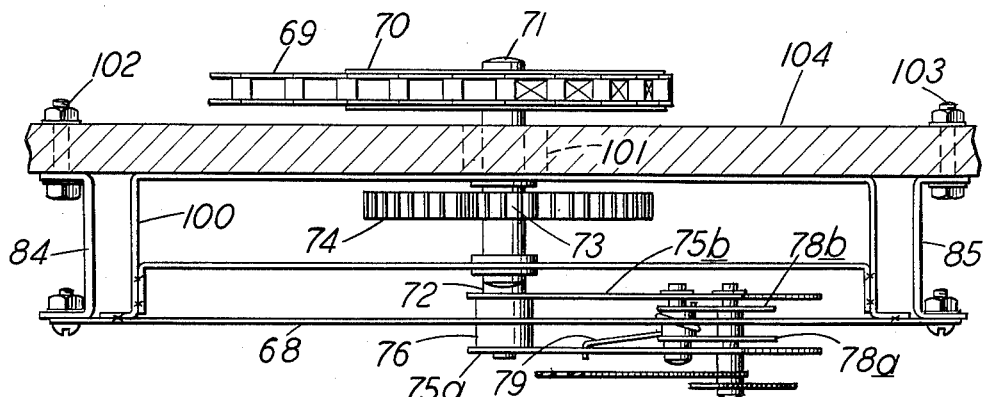
Figure 15:
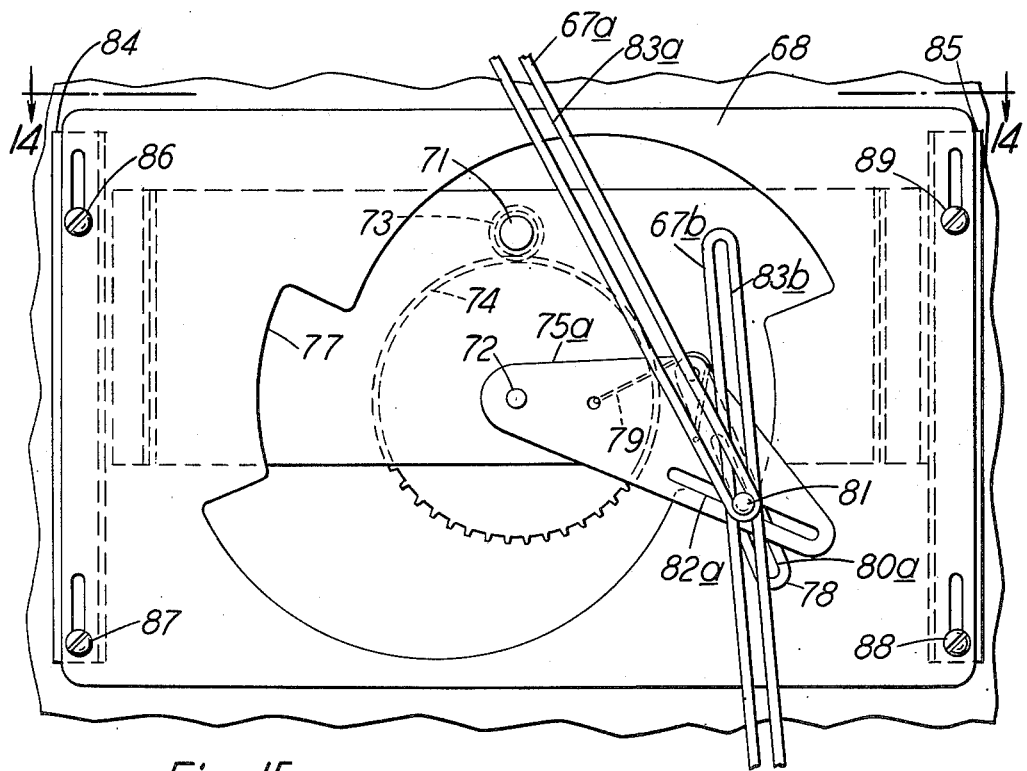

Figure 14 (see Sheet 8) presents a section taken on the plane 14—14 of Figure 15.

Figure 15 (see Sheet 8) presents a view in elevation of the central cam plate and its related mechanism. This view and Figure 14 are in projection.

Figure 16 (see Sheet 7) illustrates a protecting panel positioned at the end of the hang rod adjacent the mechanism.

Figure 17 (see Sheet 7) presents an enlarged and detailed illustration of the attachment of the panel illustrated in Figure 16 to the hang rod.

Figures 18 to 22, inclusive (see Sheet 9), present diagrams showing various stages in the cycle of operations of the device illustrated in the preceding figures.

Figure 1:
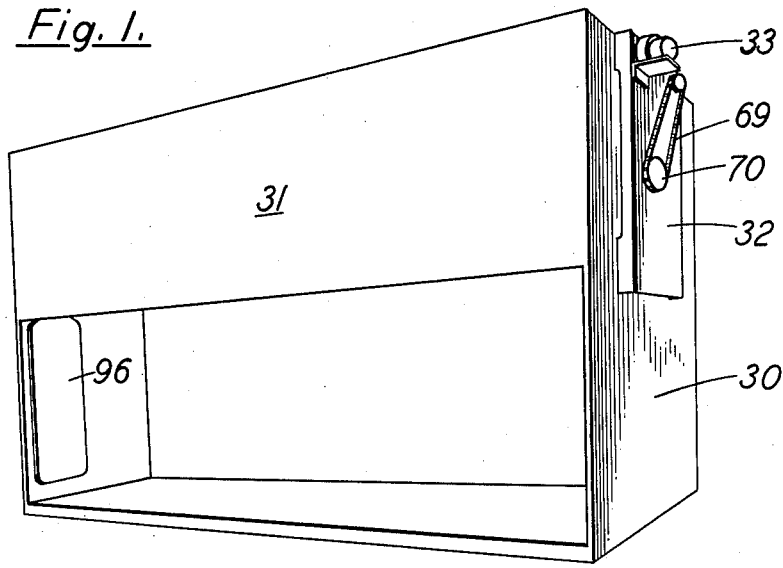
Figure 1 (see Sheet 1) is a perspective view taken in elevation of a cabinet embodying the present invention.
Figure 2:
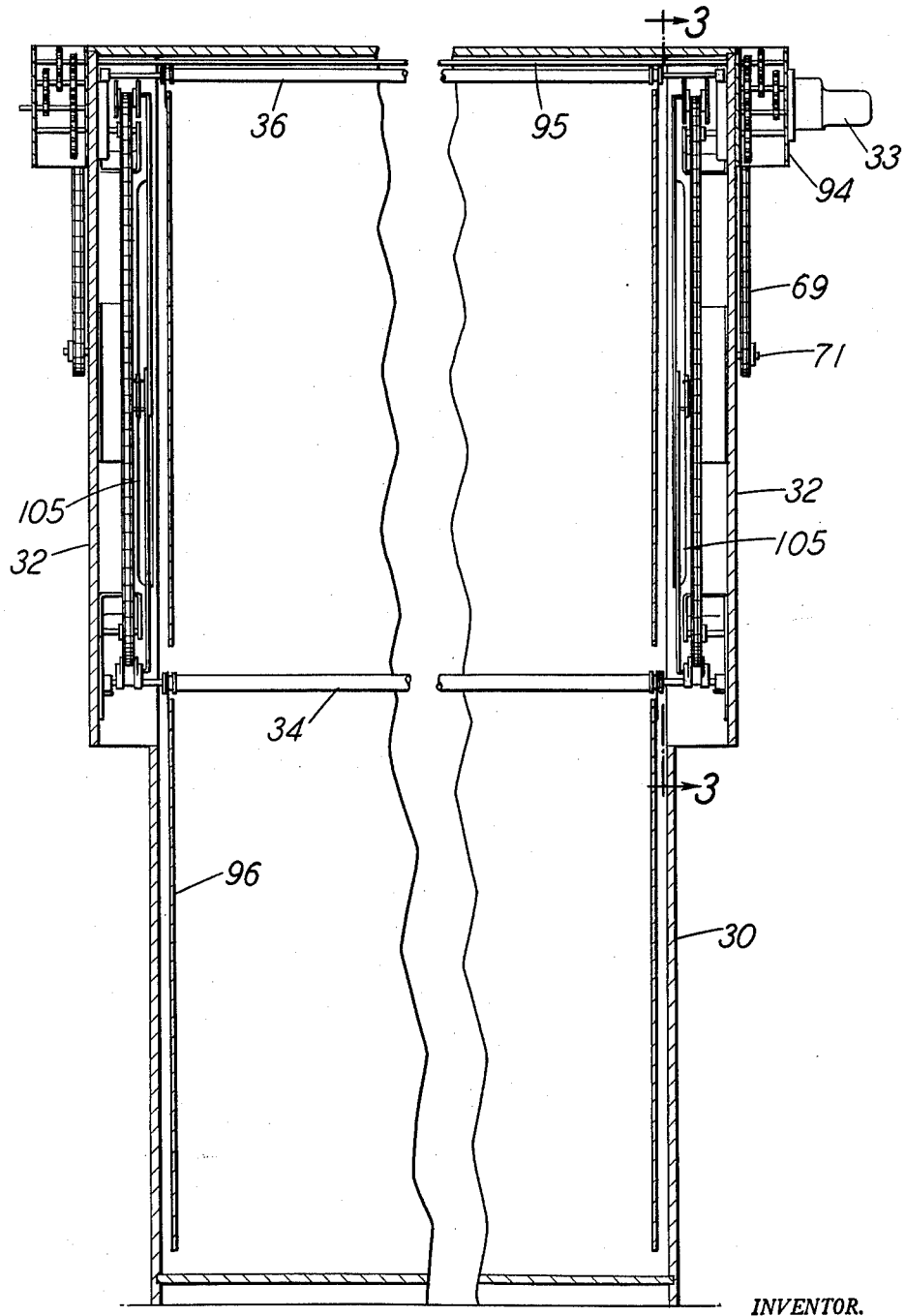
Figure 2 (see Sheet 2) is a sectional elevation taken through the cabinet illustrated in Figure 1, with a portion of the central area of the cabinet broken away to conserve space.

Referring to Figure 1 on Sheet 1, the cabinet generally indicated at 30 is open on its lower front portion to provide access to merchandise stored therein. The upper front section is preferably closed by the panel 31 to protect the contents from dust and also to establish a unitary appearance for the structure. A machinery box 32 is attached to each side of the unit, and a motor 33 is associated with one of these. Operation of conventional motor controls will result in bringing the contents of the cabinet 30 to and from the open area in the lower front portion. The illustrated device is adapted to accommodate articles of clothing suspended from hangers, and the hang rods 34 extend substantially across the width of the cabinet and are positioned by the mechanism contained within the machinery boxes 32. (Refer to Figure 2 on Sheet 2.)

The hang rod positioning mechanism is shown in its entirety in Figure 3 on Sheet 3. The hang rod units 34, 35, and 36 are carried on a track 37 formed in a closed circuit in the general pattern of a vertically-arranged rectangle. The track 37 is composed of the metal upper rail 37a, the wooden vertical side rails 37b and 37c, and the metal bottom rail 37d. Forces are applied to the hang rod units to induce movement around this track by the flexible tension member or chain 38. This chain has its path determined by the sprockets 39, 40, 41, and 42 which are maintained in position by the brackets 43, 44, 45, and 46 respectively. These sprockets establish the path of the chain 38, and it will be noted that this path substantially follows the track 37. Auxiliary rails 47, 48, and 49 are provided to give additional support to the chain 38 and to insure that it maintains a generally uniform path between the sprockets. The vertical movement of the hang rods takes place between the track sections (37b and 37c) and the auxiliary rails (48 and 49). Confining the chain and the hang rods in this manner prevents buckling of the chain under load, which might otherwise be caused by the application of this load at a point eccentric to the axis of the chain.

A step-by-step movement of the hang rods is established by a continuously-moving chain through the use of two sets of chain attachments, or rod-engaging means, that are carried by the chain as it moves around its circuit. It will be noted that while there are four legs to the track pattern (two vertical and two horizontal), there are but three hang rods. The shifting movement provided by this device involves movement of the one hang rod at any given time which is capable of advancing an entire leg without colliding with the hang rod ahead of it. As each rod capable of unobstructed movement is advanced to the unoccupied corner of the track circuit, a progressive movement is established which will cause each hang rod to pass in front of the open area of the cabinet where its contents can be examined.

Two sets of chain attachments are positioned on the chain at diametrically opposite points. These attachments in each case include a star-wheel 50 rotatably mounted preferably on one of the pins of the link chain. This wheel includes the inner component 50a and outer component 50b. Ratchets 51a and 51b are fixed with respect to the star-wheel components 50a and 50b respectively; and are engaged by the dog 52, which is pivotally connected to the chain 38 and is biased toward the ratchet by the springs 53a and 53b. The action of the ratchet permits the star-wheel to rotate in a counterclockwise direction (refer to Figure 5 on Sheet 4), but prevents rotation in a clockwise direction. With this arrangement, the star-wheel is permitted to transfer force to the rod 35 only in a direction opposite to the movement of the chain 38. This movement is indicated by the arrow 54, and proceeds from the left and to the right in the view shown in Figure 5. The purpose of these star-wheels is to carry the load of the hang rod during the movement along the downward leg of the track circuit (see Figure 10 on Sheet 5). It may be considered that the star-wheels 50 provide a series of abutment surfaces 55 capable of cooperating with the rods for the transfer of whatever forces are involved. The pivotal mounting of the star-wheels controlled by the ratchet permits the star-wheels to pass underneath the hang rods as the chain 38 moves along. The load of the hang rods is not applied to the star-wheels until one of the retracting members 56 pushes the hang rod over the upper corner of the vertical leg. The hang rod then drops into engagement with the star-wheel. The spring-restraining members 57, 58, 59, and 60 are adapted to cooperate wtih the track-engaging rollers 34a, 35a, and 36a mounted at each end of the hang rods 34, 35, and 36, and serve to hold the hang rods in position against accidental movement through vibration or other outside cause until forceably disengaged by the action of the chain attachments.

The retractable engaging members 56 are pivotally mounted on the chain 38 so that the engaging surfaces 61 are given a lateral movement with respect to the chain 38 sufficient to bring them to and from position where they may engage the hang rods. The engaging members 56 include the inner components 56a and outer components 56b, which are formed integrally with the cross member providing the surfaces 61. Lateral positioning of the engaging members 56 is accomplished by the action of the cam units 62 secured to the shafts 63, which are rotatably mounted on the carriers 64. The cam units 62 include the inner and outer components, 62a and b, respectively (both being secured to the shafts 63), and the stops 62c and 62d. These stops cooperate with stops 64c and 64d formed on the inner and outer components 64a and 64b of the carrier units 64. The cams are strongly biased in a counterclockwise direction so as to position the retractable members 56 for engaging the hang rods by the springs 65. The retractable members are themselves directly biased by the springs 66 urging them to the disengaged position. The carrier members 64 are mounted upon pins of the chain 38. The action of the springs 65 and 66 establish that the retractable engaging members 56 will be positioned for acting on the hang rods until the cams 62 are pulled out of position by the action of the links 67a and 67b. A downward pull on the link 67 as shown in Figure 5 will induce clockwise rotation of the cam 62 and thereby remove the support of the retractable engaging member 56, and thus make it unable to move the hang rod out of engagement with the spring member 57. The spring 66 will then pull the engaging member out of position and hold it in place regardless of the position of the chain.

The action of the links 67a and 67b is controlled by the mechanism associated with the central cam 68 (see Figure 3 on Sheet 3 and Figure 15 on Sheet 8). A chain 69 supplies power to the sprocket 70 (see Figures 1 on Sheet 1 and 4 on Sheet 4) and drives the shaft 71. Power is transferred from this shaft to the shaft 72 by the gears 73 and 74. A pair of similarly-shaped arms 75a and 75b are mounted on the hub 76 carried by the shaft 72, and are positioned substantially parallel to and on either side of the plane of the cam plate 68. This plate has an aperture in its central area formed in a cam surface 77. The arms 75a and 75b provide pivotal mounting for the beam 78 biased in a counterclockwise direction as shown in Figure 15 by the action of the spring 79. The beam 78 is composed of two similarly shaped components 78a and 78b, each of which is provided with slots 80a and 80b, respectively, with which the cam-following member 81 is received. This member 81 is likewise received within the slot 82a of the arm 75a and the corresponding slot 82b in the arm 75b. The action of the slots 82 and 80, together with the biasing action of the spring 79, causes the cam-following member 81 to closely follow the contour 77 of the cam plate 68 as the shaft 72 revolves. The length of the links 67 is established in cooperation with the position and shape of the cam contour 77 so as to selectively apply a pull to the chain attachment system and thus remove the retractable members 56 from engaging position at selected points during the path of movement of the chain 38. In Figure 15, it will be noted that the cam follower 81 is in engagement with the end of the slot 83a in the link 67a, and is therefore in the position to pull the associated cam out of supporting position. With the cam 62 in the position shown in Figure 5, the cam follower 81 is at some point in the slot 83 short of the end, and therefore not in position to apply force to the link 67a. Due to the action of the gears 73 and 74, the direction of rotation of the shaft 72 is opposite to the direction of movement of the chain 38.

Figure 22:
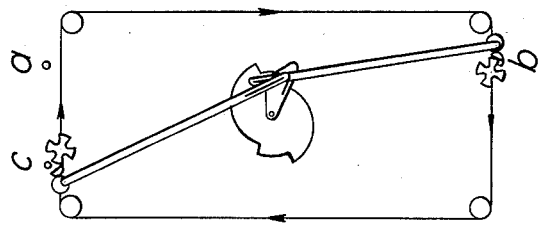
Figure 21:
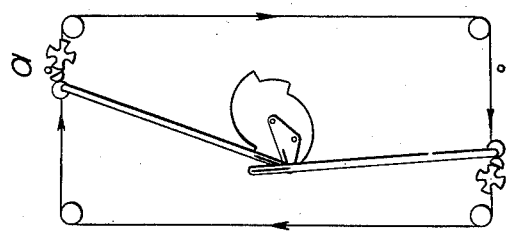
Figure 20:
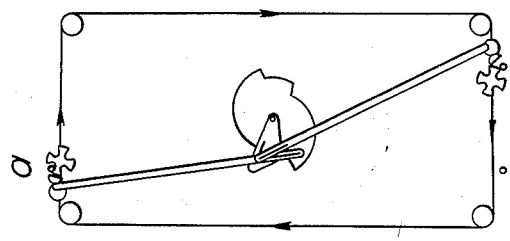
Figure 19:
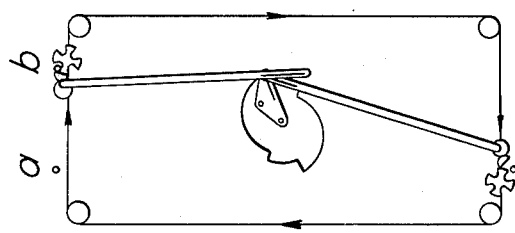
Figure 18:
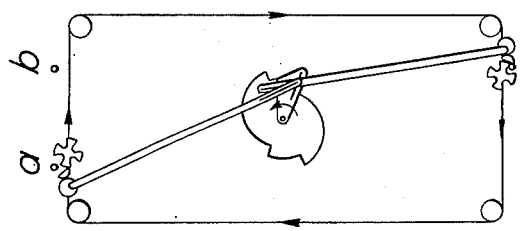

The action of the chain attachments can best be understood by reference to the diagrams presented in Figures 18 to 22, inclusive (see Sheet 9). Figure 18 presents the hang rods in a position corresponding to Figure 3. For convenience, these hang rods may be identified on the diagram as a, b, and c. In Figure 18, the tension on the link is causing the cam to remove its support from the retractable engaging member, and thus permit the chain attachments to pass under the hang rod a. The hang rod c, however, is engaged by a retractable member due to the positioning of the cam under the influence of the associated springs. No tension is being applied by the associated links to remove the cam from supporting position. The movement of the chain with the attachments in the condition indicated in Figure 18 will cause the hang rod c to move from the position illustrated to the left to the position indicated in Figure 19. No other action will be taken during this movement. The moment the hang rod c arrives at the end of the lower horizontal leg, the central cam mechanism will cause the link then associated with the hang rod c to pull the cam from supporting position behind the retractable engaging member, and thus permit the chain attachments to pass under the hang rod c. Continued movement of the chain in a clockwise direction will therefore, at that moment, have no further effect upon the hang rod c. However, since tension is no longer applied by the central cam mechanism to the opposite link, hang rod b will be engaged by the retractable engaging member and will be then moved by the chain over the upper right corner so as to begin its movement along the downward leg of the circuit. As soon as this downward leg is reached, the weight of the hang rod will cause it to drop downwardly on the star-wheel associated with that set of chain attachments (see Figure 10 on Sheet 5). The action then taking place will be a lowering of the hang rod b downward to the point indicated in Figure 20. At this point the central cam surface will apply a pull to the link then associated with hang rod b and remove the retractable engaging member from position. At this time, hang rod a will be engaged, and movement of the chain will then cause that hang rod to assume the position shown in Figure 21. On arrival at this position, the engaging member will be removed from engaging position by the action of the associated link, and the next movement will involve the engagement of the hang rod c and its elevation along the upward section of the track circuit to the point indicated in Figure 22. It will be noted that Figure 22 presents the hang rods in a generally similar arrangement to that shown in Figure 18. It is thus evident that with four legs of track and three hang rods, it is always possible to move one hang rod to the unoccupied corner of the track circuit. A step-by-step action is thus established causing each hang rod to be progressively moved until it passes to and from the open portion of the cabinet.

The close cooperation between the various components of the illustrated structure makes very desirable the provision of some sort of adjustment with which accumulations of tolerance can be removed. For this purpose, the central cam plate 68 is mounted on brackets 84 and 85 (see Figure 15 on Sheet 8), and is secured there by the screws 86, 87, 88, and 89 acting within associated slots on the cam plate 68 so as to permit a considerable amount of vertical adjustment to give the necessary position of the cam surface 77. In addition to this adjustment, a length adjustment can be provided, if desired, in the link 67a at the fastenings 90a and 91a (refer to Figure 5 on Sheet 4), and the corresponding fastenings 90b and 91b on the opposite link 67b, which secure the components of the links together. The adjustment of chain tension is accomplished by mounting the sprocket brackets 44 and 45 upon a single plate 92 secured in position by the bolts 93 having slotted engagement with the structure of the cabinet, and permitting vertical movement of the plate to secure the necessary tension in the chain 38.

Referring to Figure 6 on Sheet 5, the driving power supplied to the mechanism is derived from the action of the motor 33 through the gears contained within the housing 94. A similar housing is positioned at the opposite end of the cabinet, and power is supplied to the mechanism associated therewith by means of the shaft 95 which extends substantially the entire width of the cabinet. An examination of Figure 3 will make it evident that a considerable amount of mechanism is exposed to the inner area of the cabinet, and it is desirable to shield the clothing carried upon the hang rods from contact therewith. Accordingly, the shielding panels 96 (refer to Figure 16 on Sheet 7) are preferably provided at each end of the hang rods, and are attached thereto as indicated in Figure 17 (see Sheet 7). A pair of flanges 97 and 98 provide for locating the upper extension 99 of the shield panel 96.

The illustrated embodiments of the present invention may be described as a series of metal attachments to a wooden structure. Reference to Figure 1 will clearly indicate the fact that the cabinet 30 may be of any convenient width, and will still be capable of being operated by mechanism associated with the machinery boxes. The device can thus be adapted to any particular store installation that may be desired. The formation of standard metal components such as the housing 94, the rail and track structures, the sprocket brackets, and the chassis unit 100 associated with the central cam 68 permits a manufacturer to stock a considerable number of these units, since they will be adapted to each individual installation regardless of the width of the cabinet. The cabinets themselves can be produced with enlarged openings such as is indicated at 101 in Figure 14 (see Sheet 8) so that the point where the moving members pass through the wood cabinet structure will have substantial clearance. Bolts such as are indicated at 102 and 103 may be located as needed by fitting the entire metal structure into approximate position desired and then through-drilling through the wood structure if it is not desired to accurately locate the holes in such places as the panel 104 during the manufacture of the cabinet itself. Clearance slots 105 (see Figure 2) in the sides of the machinery boxes 32 are provided to give clearance for the free ends of the links 67a and 67b as they pass through the horizontal position during the movement of the chain.

While the illustrated device is adapted principally for the accommodation of clothing, a series of suspended cases or racks may be attached to the hang rods to enable the cabinet to house small parts, bulk merchandise, or practically any item or commodity that can be imagined. The particular embodiments of the present invention that have been illustrated in the accompanying drawings are not to be considered as a limitation upon the scope of the appended claims. In these claims it is my intention to claim the entire invention to which I am entitled in view of the prior art.

I claim:

1. In a storage and display cabinet having track means, article-supporting means including rod means provided with track-engaging means, endless flexible tension means, guide means for said tension means establishing a path of movement substantially following said track means, and drive means for said tension means establishing a direction of movement thereof, the combination comprising: first rod-engaging means carried by said tension means, said first rod-engaging means being adapted to apply force to said rod means only in a direction opposite to the direction of movement of said tension means; second rod-engaging means, carried by said tension means behind said first rod-engaging means, and including lever means pivotally mounted on said tension means, cam means pivotally mounted on said tension means and adapted to bear on said lever means to induce rotation of said lever means to a position for engaging said rod means, and biasing means urging said lever means to non-engaging position; and actuating means for said cam means, said actuating means including fixed cam plate means, cam follower means adapted to follow the contour of said fixed cam plate means at a rate related to the movement of said tension means, a spring biasing said follower means toward said contour, and link means connecting said cam follower means and said cam means.

2. A conveying mechanism comprising: track means; rod means provided with track-engaging means; endless flexible tension means; means carried by said tension means and adapted to engage said rod means in a path displaced to one side of said tension means; guide means for said tension means establishing a path of movement substantially following said track means, said guide means including rail means disposed on the opposite side of said tension means from said rod engaging path, and said track means being disposed opposite said guide means and substantially coextensive therewith to bear on said track-engaging means in a direction to urge said rod means toward said tension means; and drive means for said tension means.

WILLIAM BRONSON LYON.

References Cited in the file of this patent

UNITED STATES PATENTS

| Number | Name | Date |
|---|---|---|
| 934,890 | Davidson | Sept. 21, 1909 |
| 971,596 | Cooper | Oct. 4, 1910 |
| 1,057,197 | Wilson | Mar. 25, 1913 |
| 1,194,210 | Mininberg | Aug. 8, 1916 |
| 1,368,533 | Aimes | Feb. 15, 1921 |
| 1,450,850 | Grip | Apr. 3, 1923 |
| 1,542,817 | Bernheim | June 23, 1925 |
| 2,155,583 | Bonnar | Apr. 25, 1939 |
| 2,253,333 | Jaeckel | Aug. 19, 1941 |
| 2,260,528 | Levy et al. | Oct. 28, 1941 |
| 2,513,502 | Lyon | July 4, 1950 |